United States Patent
Chang et al.

(10) Patent No.: US 7,768,591 B2
(45) Date of Patent: Aug. 3, 2010

(54) DISPLAY PANEL MODULE HAVING AN ADHESIVE MEMBER BETWEEN A CASING AND THE DISPLAY PANEL WITH A BREATHING STRUCTURE HAVING A CAPILLARY PRODUCED IN THE ADHESIVE MEMBER

(75) Inventors: Yi-Hui Chang, Hsinchu (TW); Ting-Fang Luo, Taichung (TW)

(73) Assignee: TPO Displays Corp., Chu-Nan (TW)

( * ) Notice: Subject to any disclaimer, the term of this patent is extended or adjusted under 35 U.S.C. 154(b) by 312 days.

(21) Appl. No.: 11/974,338

(22) Filed: Oct. 11, 2007

(65) Prior Publication Data
US 2008/0088766 A1 Apr. 17, 2008

(30) Foreign Application Priority Data
Oct. 11, 2006 (TW) .............................. 95137290 A

(51) Int. Cl.
*G02F 1/1333* (2006.01)

(52) U.S. Cl. ........................................ 349/58; 349/161
(58) Field of Classification Search ................. 349/58, 349/161
See application file for complete search history.

(56) References Cited

U.S. PATENT DOCUMENTS 4,763,993 A * 8/1988 Vogeley et al. ............... 349/161
2003/0231271 A1* 12/2003 Saitoh ......................... 349/122

FOREIGN PATENT DOCUMENTS

JP 2005-062777 3/2005

* cited by examiner

*Primary Examiner*—John Heyman
(74) *Attorney, Agent, or Firm*—Liu & Liu

(57) ABSTRACT

The present invention relates to a display panel module. The display panel module includes a display panel; a first casing having a hollow region; an addition member arranged on the first casing; a first adhesive member having one side attached on the first casing, another side attached on the display panel and a breathing structure; and a second casing coupled with the first casing to fix the display panel therebetween.

20 Claims, 7 Drawing Sheets

DISPLAY PANEL MODULE HAVING AN ADHESIVE MEMBER BETWEEN A CASING AND THE DISPLAY PANEL WITH A BREATHING STRUCTURE HAVING A CAPILLARY PRODUCED IN THE ADHESIVE MEMBER

FIELD OF THE INVENTION

The present invention relates to a display panel module, and more particularly to a display panel module with low cost and excellent display effect.

DESCRIPTION OF THE RELATED ART

Referring to FIG. 1, a conventional display panel module 1 is shown. The conventional display panel module 1 includes a first casing 11, a second casing 12 having two corresponding sidewalls coupled with those of the first casing 11, a liquid crystal display panel 10 and a backlight module 15 fixed between the first casing 11 and the second casing 12. The backlight module 15 is arranged between the liquid crystal display panel 10 and the second casing 12 for providing beams to pass through the liquid crystal display panel 10 for displaying images. The first casing 11 includes a hollow region 110 arranged correspondingly to a display region 100 of the liquid crystal display panel 10. The conventional liquid crystal display panel module 1 further includes a double-side adhesive tape 13 arranged between the periphery of the liquid crystal display panel 10 and the first casing 11 for fixing the liquid crystal display panel 10. Referring to FIGS. 2 and 3 together, since the double-side adhesive tape 13 have two viscous sides, one side of the double-side adhesive tape 13 is attached on the inner side of the first casing 11, and another side is attached on the periphery of the liquid crystal display panel 10 for fixing the liquid crystal display panel 10 on the first casing 11.

The above mentioned liquid crystal display panel 1 has a steady structure, however, the conventional liquid crystal display panel 1 often further includes an additional member 16, such as touch panel, protecting mirror or protecting film, arranged on the first casing 11 to be configured for enhancing the functions. The additional member 16 is attached on the first casing 11 through another double-side adhesive tape 17. One side of the double-side adhesive tape 17 is attached on the outer side of the first casing 11, and another side thereof is attached on the periphery of the additional member 16 so that the liquid crystal display panel 10 is completely sealed for preventing from being scraped or the dust entering the hollow region 110 between the liquid crystal display panel 10 the additional member 16. Therefore, if the liquid crystal display panel 1 is under an altitude low pressure condition, a pressure difference is produced between the hollow region 110 and the exterior so that the hollow region 110 presents a negative pressure or vacuum condition and the additional member 16 makes sunken. Furthermore, the additional member 16 may even touch or adhere with the surface of the liquid crystal display panel 10 so that the liquid crystal display panel 10 displays badly.

What is needed, therefore, is a display panel module having an excellent display effect.

BRIEF SUMMARY

A display panel module in accordance with a preferred embodiment, includes a display panel; a first casing having a hollow region; an addition member arranged on the first casing; a first adhesive member having one side attached on the first casing, another side attached on the display panel and a breathing structure; and a second casing coupled with the first casing to fix the display panel therebetween.

The breathing structure is a notch extending from a side of the first adhesive member to an edge of the display panel for solving the negative pressure existed between the display panel and the first casing so that the display panel is under a non-vacuum condition.

The breathing structure is a non-adhesive region arranged on a side of the first adhesive member opposite to the display panel. The non-adhesive region extends from a side of the first adhesive member to an edge of the display panel or spans over the first adhesive member such that the pressure between the display panel and the first casing can achieve a balance not to produce a negative pressure.

The above breathing structure can make the pressure in the hollow region achieve the balance.

Other objects, advantages and novel features of the invention will become more apparent from the following detailed description when taken in conjunction with the accompanying drawings, in which:

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe a preferred embodiment of the present heat effect switch, in detail.

Figure 1:
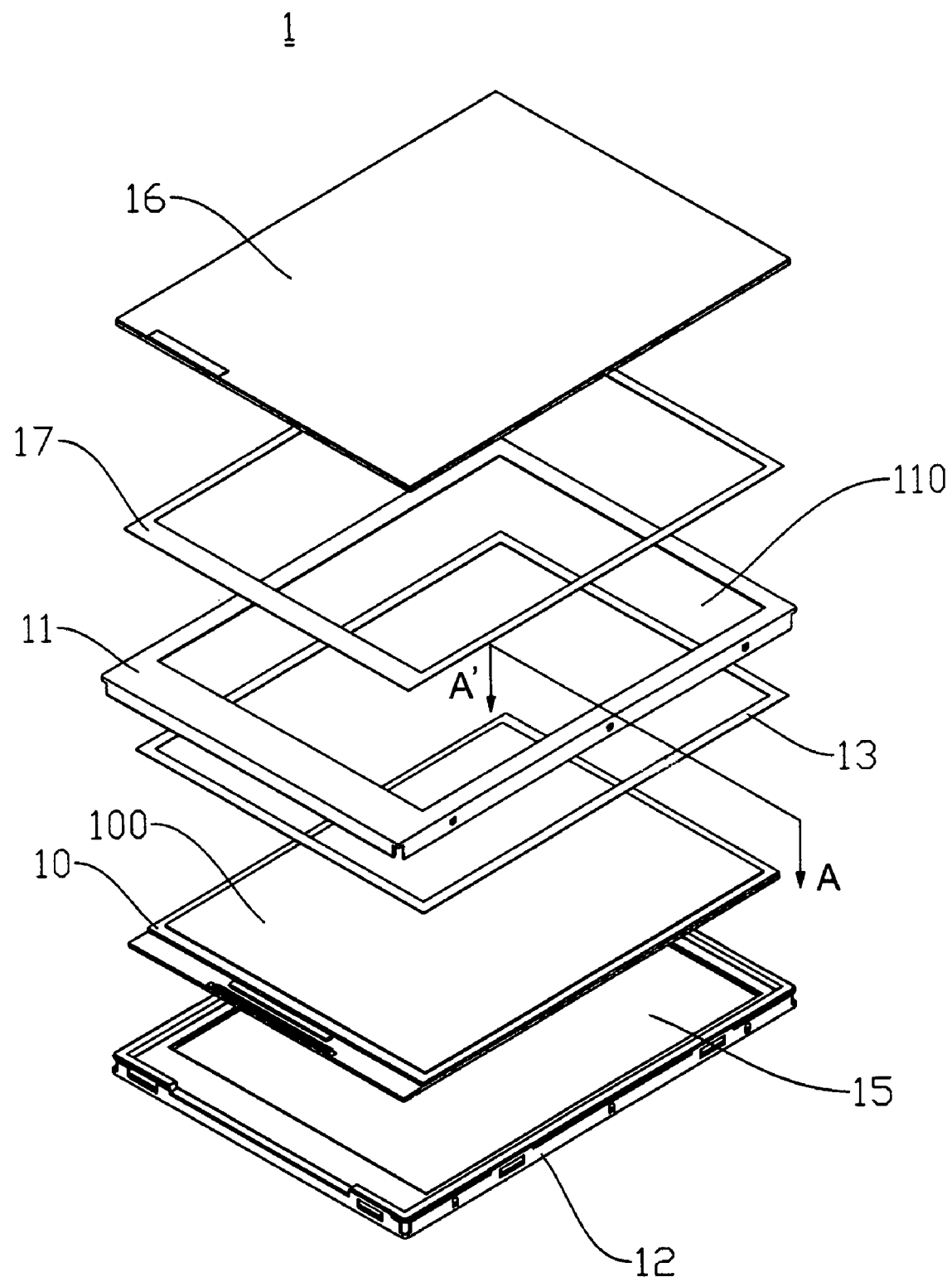
FIG. 1 is a schematic, exploded view of a conventional liquid crystal display panel module.
Figure 2:
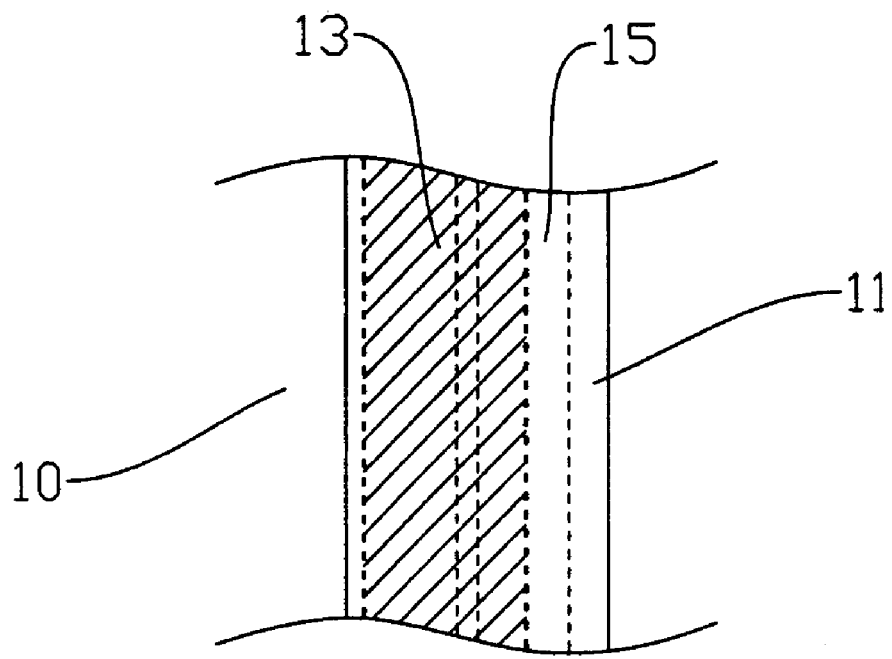
FIG. 2 is a schematic, top view of the conventional liquid crystal display sealed by a double-side adhesive tape.
Figure 3:
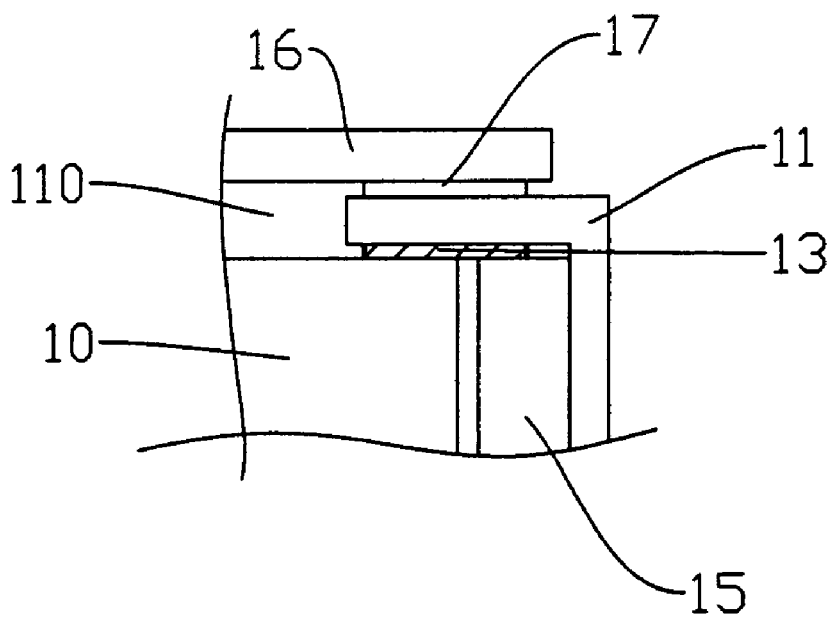
FIG. 3 is a schematic, cross-sectional view of the FIG. 1, taken along a line of A-A'.
Figure 4:
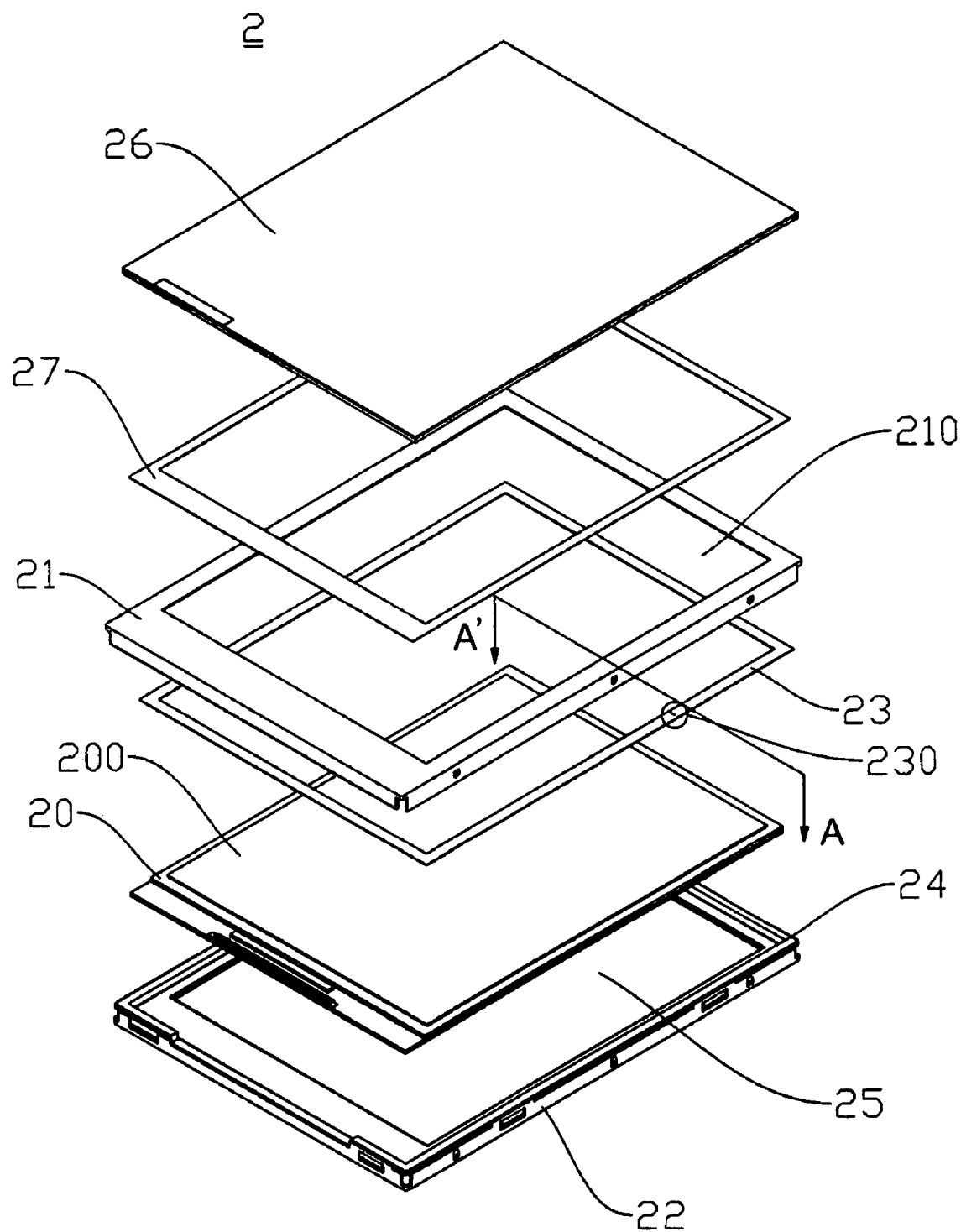
FIG. 4 is a schematic, exploded view of a display panel module in accordance with the present invention.

Referring to FIG. 4, a display panel module 2 in accordance with a preferred embodiment of the present invention is shown. The present display panel module 2 includes a display panel 20, a first casing 21, a frame 24, a second casing 22 and an additional member 26. The frame 24 is arranged around the periphery of the display panel 20 for enhancing the structure of the display panel module 2. However, the frame is not limited to the above. Preferred, the display panel 20 is a liquid crystal display panel. The display panel module 2 further includes a light source module 25 arranged between the display panel 20 and the second casing 22 for cooperating with the liquid crystal display panel and providing beams to pass through the display panel 20 for displaying images.

The first casing 21 is coupled with the second casing 22. Preferred, the first casing 21 has two sidewalls coupled with those of the second casing 22 for fixing the display panel 20 and the frame 24 therebetween. The first casing 21 includes a hollow region 210 corresponding to a display region 200 of the display panel 20 so that displaying images (not shown) in the display region 200 of the display panel 20 can be viewed. Furthermore, the second casing 22 may also have a hollow region (not shown) based on the need of the corresponding display panel 20 (the display panel 20 may be a transmissive mode or double-side display panel). The hollow region corresponds to another display region (not shown) of the display panel 20 so that the displaying images (not shown) in another display region (not shown) of the display panel 20 can be viewed.

The display panel module 2 further includes a first adhesive member 23, which has one side attached on the inner side of the first casing 21, and another side attached on the periphery of the display panel 20. The first adhesive member 23 further includes a breathing structure 230 for adjusting the pressure of the hollow region 210, which is transferred with the pressure of the environment, so as to prevent the addition member 26 from being sunken, which is produced by the pressure difference. The breathing structure 230 is shown in following.

Figure 5:
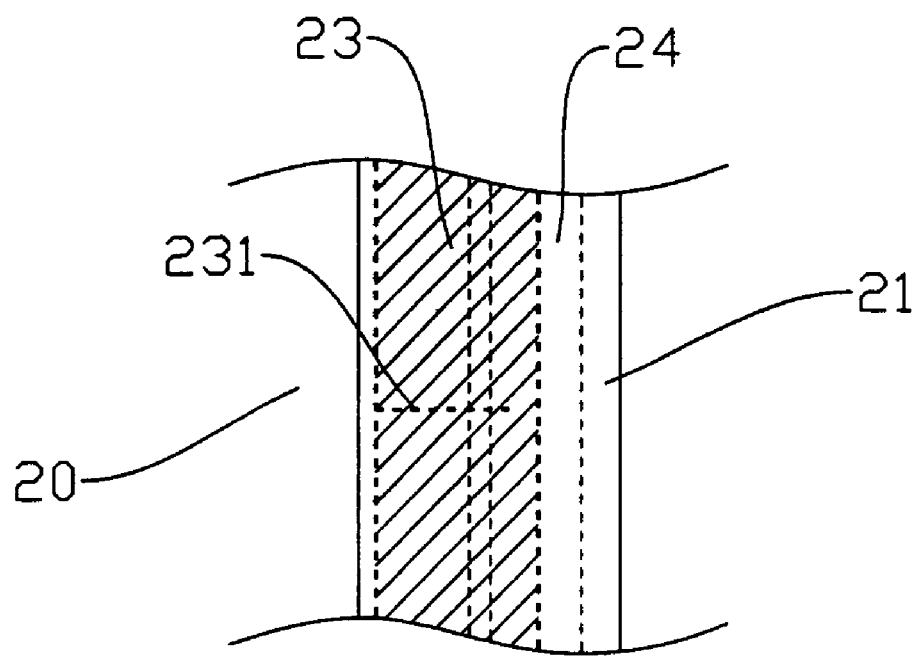
FIG. 5 is a schematic, top view of a breathing structure in the display panel module in accordance with a first preferred embodiment of the present invention.
Figure 6:
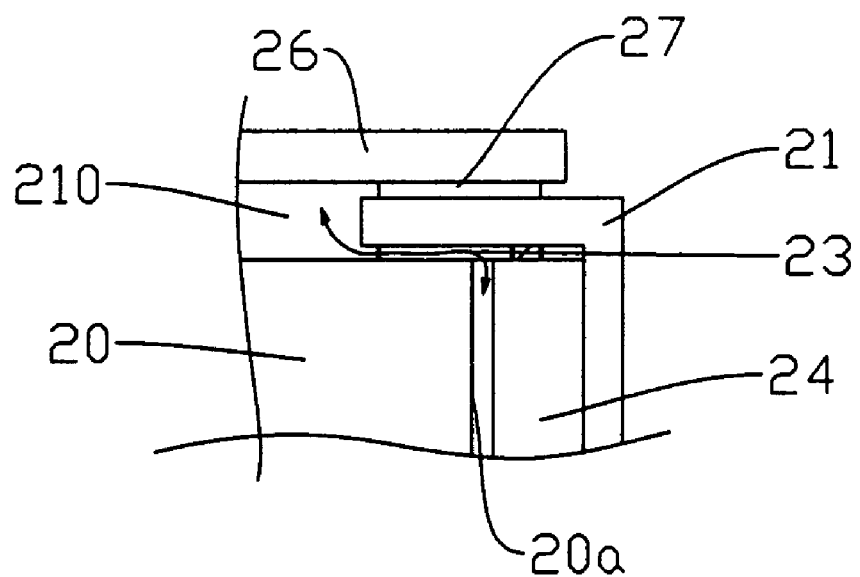
FIG. 6 is a schematic, cross-sectional view of the FIG. 4, taken along a line of A-A', in accordance with the first preferred embodiment of the present invention.

Referring to FIGS. 5 and 6, a top view and a section view of the breathing structure in the first preferred embodiment of the present invention are shown. In this exemplary embodiment, the breathing structure 230 is a notch 231 as shown in FIG. 5. The notch 231 extends from an inner side of the first adhesive member 23 to exceeding an edge 20a of the display panel 20. The notch 231 makes a slit in the adhesive member 23 so that the air in the hollow 210 is communicated with the environment. An air breaching direction is shown as a curved arrowhead shown in FIG. 6.

Figure 7:
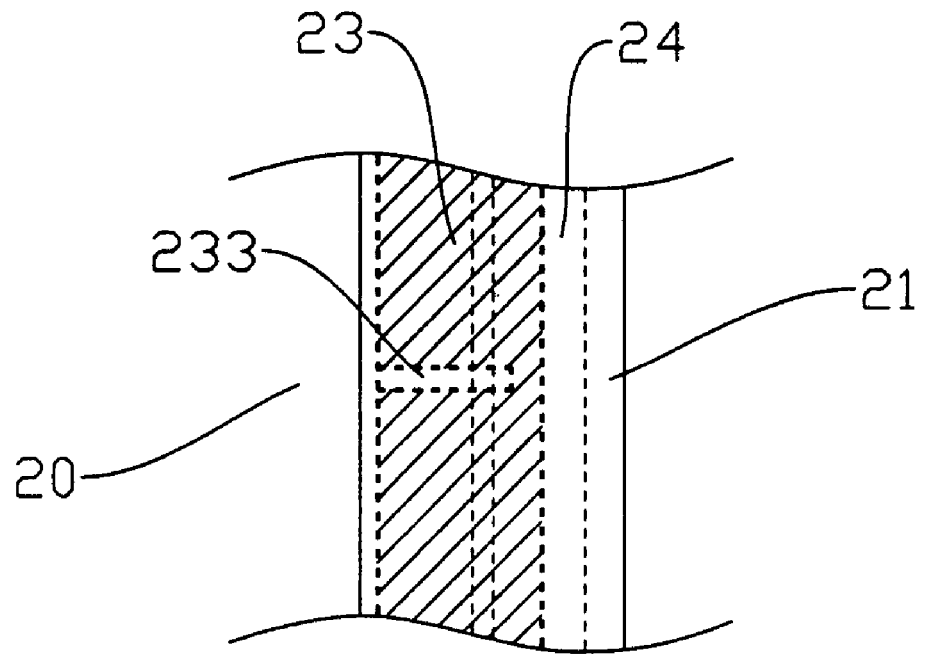
FIG. 7 is a schematic, top view of a breathing structure of a display panel module in accordance with a second preferred embodiment of the present invention.

Referring to FIG. 7, a top view of the breathing structure in accordance with a second preferring embodiment is shown. In this exemplary embodiment, the breathing structure 230 is a non-adhesive region 233 as shown in FIG. 7. The non-adhesive region 233 is arranged at a side of the first adhesive member 23 opposite to the display panel 20. In this exemplary embodiment, the non-adhesive region 233 extends from an inner side of the first adhesive member 23 to exceeding an edge of the display panel 20. Since the non-adhesive region 233 has no colloid thereon, a breaching room is produced when the first adhesive member 23 is attached on the display panel 20 so that the hollow region 210 is communicated with the environment.

Figure 8:
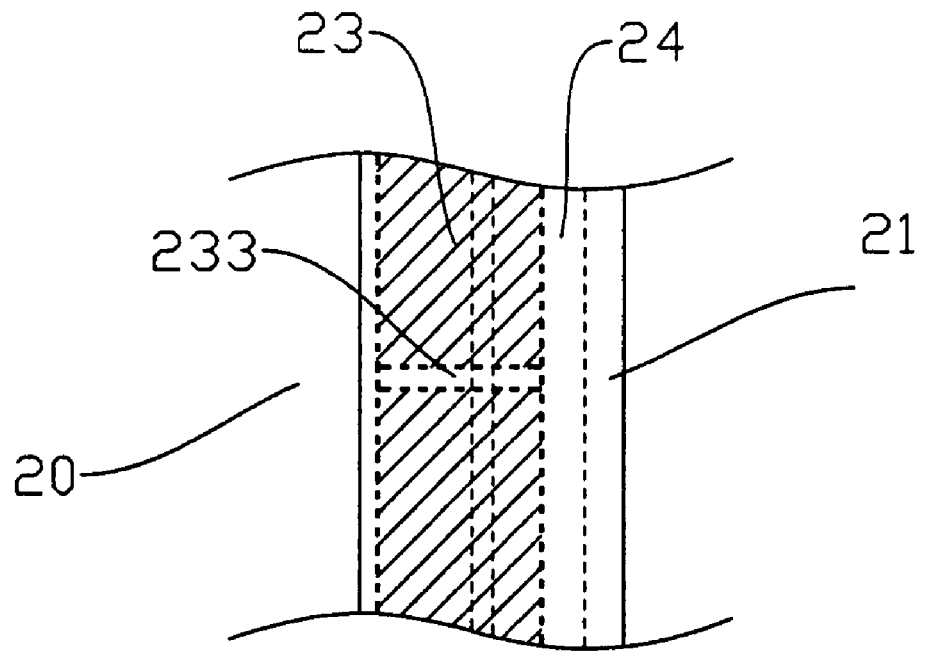
FIG. 8 is a schematic, top view of another breathing structure of the display panel module in accordance with the second preferred embodiment of the present invention.

The non-adhesive region 233 of the above embodiment may also span over the first adhesive member 23 as shown in FIG. 8, so that the air of the hollow region 210 is communicated with the environment. Alternatively, the non-adhesive region 233 may also be arranged on a side (not shown) of the first adhesive member 23 opposite to the first casing 21.

Figure 9:
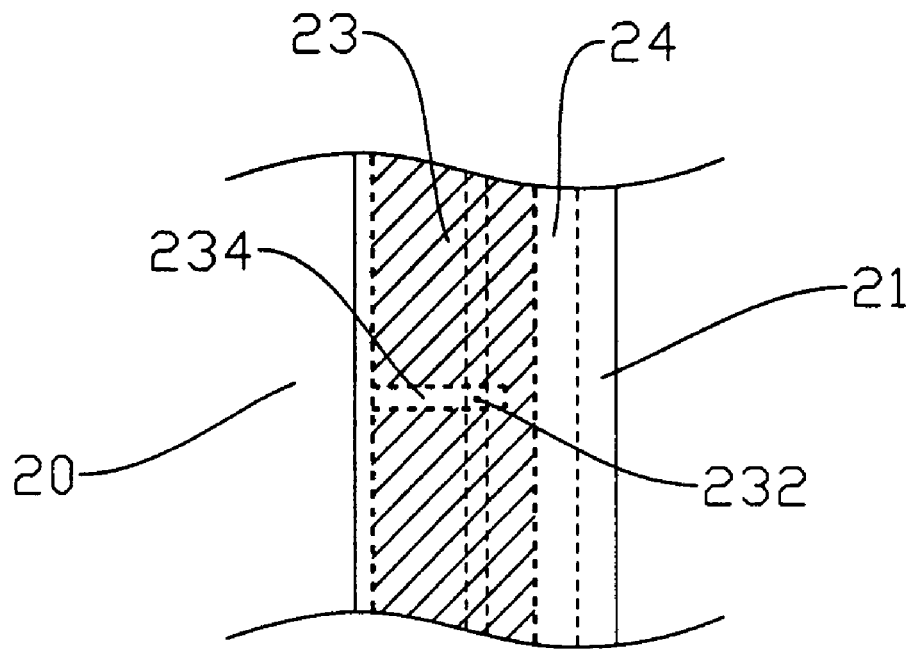
FIG. 9 is a schematic, top view of a breathing structure of a display panel module in accordance with a third preferred embodiment of the present invention.

Referring to FIG. 9, a top view of the breathing structure in accordance with a third preferring embodiment of the present invention is shown. In this exemplary embodiment, the breathing structure 230 is a breathing hole 232 passing through the first adhesive member 23 and the non-adhesive region 234 as shown in FIG. 9. The breathing hole 232 is arranged at the edge of the display panel 20. Preferred, the breathing hole 232 is arranged between the display panel 20 and the frame 24. Since the breathing hole 232 makes a capillary produced in the first adhesive member 23, the environment can be communicated with the non-adhesive region 234 and the hollow region 210 through the breathing hole 232 when the first adhesive member 23 is attached between the first casing 21 and the display panel 20.

Figure 10:
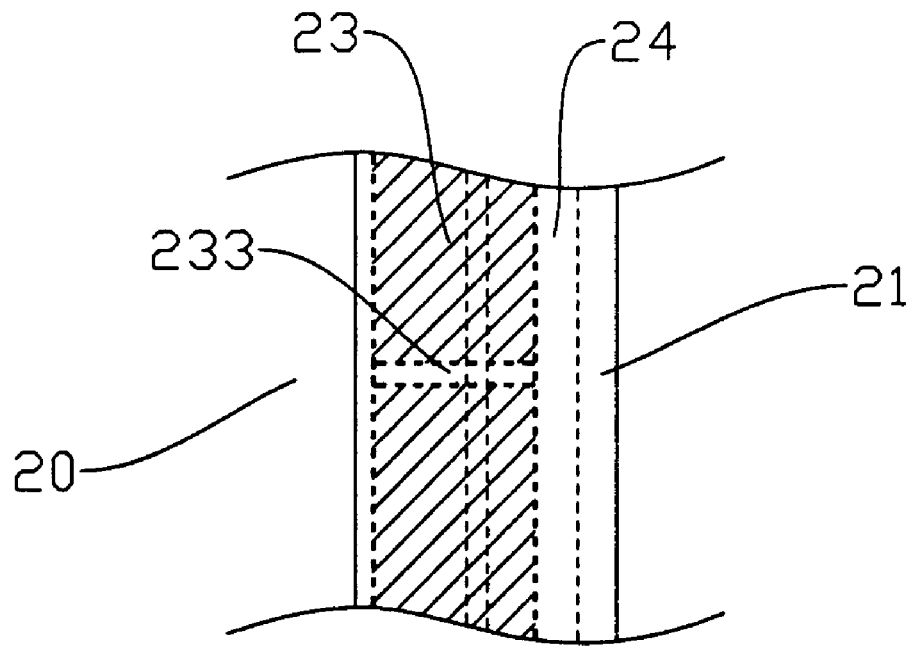
FIG. 10 is a schematic, top view of a breathing structure of a display panel module in accordance with a fourth preferred embodiment of the present invention.
Figure 11:
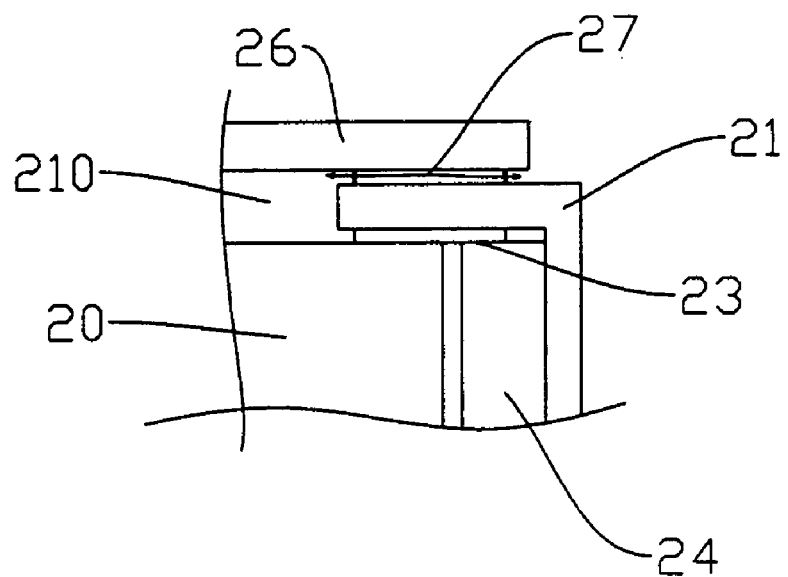
FIG. 11 is a schematic, cross-sectional view of FIG. 4, taken along the line of A-A', in accordance with the fourth preferred embodiment of the present invention.

Referring to FIGS. 10 and 11, the breathing structure in accordance with a fourth embodiment of the present invention is shown. The breathing structure of this exemplary embodiment is similar to those of the above, except that the breathing structure is arranged on the second adhesive member 27, and the second adhesive member 27 is attached between the first casing 21 and the periphery of the addition member 26. The breathing structure is a non-adhesive region 233 as shown in FIG. 10. The non-adhesive region 233 spans over the second adhesive member and the air breaching direction is shown as the arrowhead shown in FIG. 11. The hollow region 210 can also be communicated with the environment.

Figure 12:
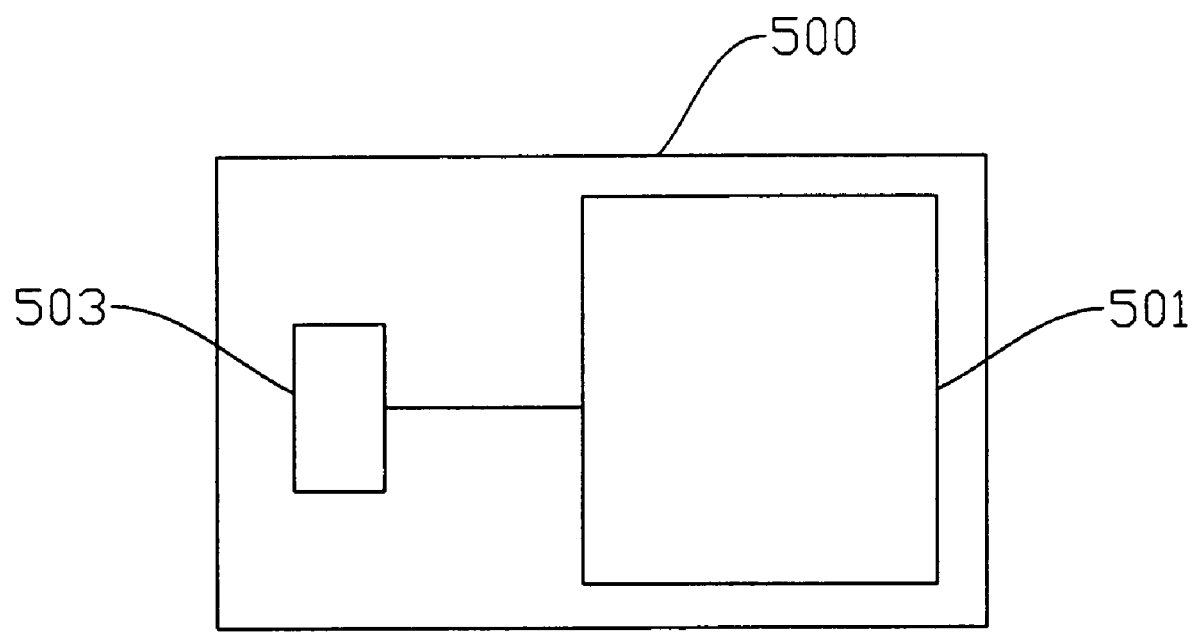
FIG. 12 is a schematic, function view of an electrical device using the display panel module of the present invention.

Referring to FIG. 12, a display panel module 501 presented in the above embodiments, can be used in an electrical device 500. The electrical device 500 may be a portable device, such as PDA, notebook computer, tablet computer, laptop computer, mobile telephone, display screen device, liquid crystal display, or desktop computer, and so on. The electrical device 500 may further include a control 503 electrically connecting with the display panel module 501 to control the display panel module 503 for displaying images.

Therefore, the exemplary embodiments of the present invention use the adhesive member to provide the breathing structure so that the display panel is under a non-vacuum condition to solve the pressure difference produced between the hollow region, which is between the display panel and the addition member, and the environment. The problem of the addition member being sunken can be solved. Furthermore, based on the experiment results, the non-adhesive region of the above exemplary embodiments, not only can be communicated with the environment, but also can prevent the object (such as dust) into the hollow region, which the hollow region is under non-vacuum condition or the pressure is in a balance process. Therefore, the non-adhesive region may have a dust-proof effect. The technology of the present invention may be used not only in the liquid crystal display panel module, but also in other type display panel (for example, Organic Light-Emitting Diode display panel, OLED).

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A display panel module, comprising:
a display panel;
a first casing;

a first adhesive member having one surface attached on the first casing, another surface attached on the display panel, and a breathing structure having a capillary produced in the first adhesive member;

a second casing coupled with the first casing to fix the display panel therebetween.

2. The display panel module as claimed in claim 1, wherein the breathing structure is a notch, which extends from a side of the first adhesive member to an edge of the display panel or from an inner side of the first adhesive member to exceed the edge of the display panel.

3. The display panel module as claimed in claim 1, wherein the breathing structure is a non-adhesive region arranged on a side of the first adhesive member opposite to the display panel, and the non-adhesive region extends from a side of the first adhesive member to an edge of the display panel or from an inner side of the first adhesive member to exceed the edge of the display panel.

4. The display panel module as claimed in claim 1, wherein the breathing structure is a non-adhesive region arranged on a side of the first adhesive member opposite to the display panel, and the non-adhesive region spans over the first adhesive member.

5. The display panel module as claimed in claim 1, wherein the breathing structure is a non-adhesive region arranged on a side of the first adhesive member opposite to the first casing, and the non-adhesive region spans over the first adhesive member.

6. The display panel module as claimed in claim 1, wherein the breathing structure comprises a breathing hole passing through the first adhesive member and a non-adhesive region, the breathing hole is arranged at an edge of the display panel, the non-adhesive region is arranged on a side of the first adhesive member opposite to the first casing, and extends from a side of the first adhesive member to the edge of the display panel or from an inner side of the first adhesive member to exceed the edge of the display panel.

7. The display panel module as claimed in claim 1, wherein the breathing structure includes a breathing hole passing through the first adhesive member and a non-adhesive region, the breathing hole is arranged at an edge of the display panel, the non-adhesive region is arranged on a side of the first adhesive member opposite to the first casing, and the non-adhesive region spans over the first adhesive member.

8. The display panel module as claimed in claim 1, further comprising an addition member arranged on the first casing.

9. The display panel module as claimed in claim 8, further comprising a second adhesive member having a side attached on the first casing and another side attached on the addition member, and the second adhesive member further comprising another breathing structure.

10. The display panel module as claimed in claim 9, wherein the breathing structure is a non-adhesive region spanning over the second adhesive member.

11. The display panel module as claimed in claim 1, further comprising a frame arranged around the periphery of the display panel.

12. The display panel module as claimed in claim 1, wherein the first casing has two sidewalls coupled with those of the second casing to be configured for fixing the display panel therebetween, the first casing or the second casing comprises a hollow region respectively corresponding to a display region of the display panel.

13. The display panel module as claimed in claim 1, wherein the first adhesive member is selected from a group consisting of a double-side adhesive tape, a single-side adhesive tape, a foam type double-side adhesive tape and a foam type single-side adhesive tape.

14. The display panel module as claimed in claim 9, wherein the second adhesive member is selected from a group consisting of a double-side adhesive tape, a single-side adhesive tape, a foam type double-side adhesive tape and a foam type single-side adhesive tape.

15. The display panel module as claimed in claim 1, wherein the display panel is a liquid crystal display panel.

16. An electrical device, comprising:
a display panel module as claimed in claim 1; and
a control electrically connecting to the display panel module to control the display panel module for displaying images.

17. A display panel module, comprising:
a first casing;
a display panel attached on the first casing;
an addition member arranged on the first casing;
an adhesive member having a side attached on the first casing and another side attached on the addition member, and the adhesive member further comprising breathing structure having a capillary produced in the adhesive member; and
a second casing coupled with the first casing to fix the display panel therebetween.

18. The display panel module as claimed in claim 17, wherein the breathing structure is a non-adhesive region spanning over the adhesive member.

19. The display panel module as claimed in claim 17, wherein the adhesive member is selected from a group consisting of a double-side adhesive tape, a single-side adhesive tape, a foam type double-side adhesive tape and a foam type single-side adhesive tape.

20. The display panel module as claimed in claim 17, wherein the display panel is a liquid crystal display panel.

* * * * *